(12) United States Patent
Bhagavathy et al.

(10) Patent No.: US 8,467,626 B2
(45) Date of Patent: Jun. 18, 2013

(54) AUTOMATIC PARAMETER ESTIMATION FOR ADAPTIVE PIXEL-BASED FILTERING

(75) Inventors: Sitaram Bhagavathy, Plainsboro, NJ (US); Joan Llach, Princeton, NJ (US)

(73) Assignee: Thomson Licensing, Issy-les-Moulineaux (FR)

( * ) Notice: Subject to any disclaimer, the term of this patent is extended or adjusted under 35 U.S.C. 154(b) by 804 days.

(21) Appl. No.: 12/311,452

(22) PCT Filed: Jun. 25, 2007

(86) PCT No.: PCT/US2007/014890
§ 371 (c)(1),
(2), (4) Date: Mar. 30, 2009

(87) PCT Pub. No.: WO2008/042029
PCT Pub. Date: Apr. 10, 2008

(65) Prior Publication Data
US 2009/0324121 A1 Dec. 31, 2009

Related U.S. Application Data

(60) Provisional application No. 60/848,272, filed on Sep. 29, 2006.

(51) Int. Cl.
*G06K 9/40* (2006.01)
*G06K 9/20* (2006.01)
(52) U.S. Cl.
USPC ............................ 382/260; 382/275; 382/282
(58) Field of Classification Search
USPC .................. 382/254, 260, 274, 275, 282, 305, 382/312; 375/254; 358/463
See application file for complete search history.

(56) References Cited

U.S. PATENT DOCUMENTS

| 5,210,609 | A | 5/1993 | Yu |
| 5,717,463 | A | 2/1998 | Brailean et al. |

(Continued)

FOREIGN PATENT DOCUMENTS

| CN | WO0205213 | 1/2002 |
| CN | 1674633 | 9/2005 |

(Continued)

OTHER PUBLICATIONS

Jianwei Wang, "Modification and Application of Median Filtering Algorithm for Color Image Filter", Journal of Harbin University of Commerce, (Natural Science Edition), vol. 22, No. 4, Aug. 2006.

(Continued)

*Primary Examiner* — Kanjibhai Patel
(74) *Attorney, Agent, or Firm* — Robert D. Shedd; Brian J. Dorini

(57) ABSTRACT

One particular automatic parameter estimation method and apparatus estimates low level filtering parameters from one or more user controlled high-level filtering parameters. The high level filtering parameters are strength and quality, where strength indicates how much noise reduction will be performed, and quality indicates a tolerance which controls the balance between filtering uniformity and loss of detail. The low level filtering parameters that can be estimated include the spatial neighborhood and/or temporal neighborhood size from which pixel candidates are selected, and thresholds used to verify the "goodness" of the spatially or temporally predicted candidate pixels. More generally, a criterion for filtering digital image data is accessed, and a value is determined for a parameter for use in filtering digital image data, the value being determined based on whether the value results in the criterion being satisfied for at least a portion of a digital image.

26 Claims, 12 Drawing Sheets

U.S. PATENT DOCUMENTS

| | | | | |
|---|---|---|---|---|
| 5,787,207 | A * | 7/1998 | Golin | 382/254 |
| 5,943,467 | A | 8/1999 | Beyers et al. | |
| 6,240,150 | B1 * | 5/2001 | Darveau et al. | 375/350 |
| 6,339,616 | B1 | 1/2002 | Kovalev | |
| 6,529,638 | B1 | 3/2003 | Westerman | |
| 7,142,693 | B2 * | 11/2006 | Zhang et al. | 382/100 |
| 7,268,835 | B2 | 9/2007 | Babonneau et al. | |
| 7,580,589 | B2 * | 8/2009 | Bosco et al. | 382/275 |
| 7,636,488 | B2 * | 12/2009 | Fiete | 382/260 |
| 8,098,256 | B2 * | 1/2012 | Zipnick et al. | 345/581 |
| 2002/0005904 | A1 | 1/2002 | Mendis | |
| 2002/0028025 | A1 | 3/2002 | Hong | |
| 2003/0021489 | A1 | 1/2003 | Miura et al. | |
| 2003/0118214 | A1 | 6/2003 | Porikli | |
| 2003/0156301 | A1 | 8/2003 | Kempf et al. | |
| 2004/0001610 | A1 | 1/2004 | Murakami | |
| 2004/0062449 | A1 | 4/2004 | Chiu | |
| 2004/0233333 | A1 | 11/2004 | Chiu et al. | |
| 2005/0213839 | A1 | 9/2005 | Kita | |

FOREIGN PATENT DOCUMENTS

| | | |
|---|---|---|
| EP | 0961224 | 1/1999 |
| EP | 1100260 | 5/2001 |
| EP | 1133162 | 9/2001 |
| EP | 1174824 | 1/2002 |
| EP | 1324590 | 2/2003 |
| EP | 1365574 | 11/2003 |
| EP | 1617645 | 1/2006 |
| EP | 1720354 | 11/2006 |
| GB | 2264414 | 8/1993 |
| JP | 10187965 A | 7/1998 |
| JP | 2005124207 A | 5/2012 |
| TW | 576103 | 2/2004 |
| WO | WO9409592 | 4/1994 |
| WO | WO2004021303 | 3/2004 |
| WO | WO2005079072 | 8/2005 |
| WO | WO2005079077 | 8/2005 |
| WO | WO2008005007 | 1/2008 |

OTHER PUBLICATIONS

Amer et al., "Fast and Reliable Structure-Oriented Video Noise Estimation," IEEE Transactions on Circuits and Systems for Video Technology, vol. 15, No. 1, IEEE Senders Center, Piscataway, NJ, USA. Jan. 1, 2005, pp. 113-118, XP011124872.

Bhagavathy et al., "Adaptive Spetto-Temporal Video Noise Altering for High Quality Applications," 2007 IEEE Int'l. Conference on Acoustics, Speech, and Signal Processing, Apr. 15-20, 2007, Honolulu, HI, USA, Piscataway, NJ, USA, pp. 1-761-4, XP002497844.

Brailean et al., "Noise Reduction filters for Dynamic image Sequences: A Review," Proceedings of the IEEE, NY, USA, vol. 83, No. 9, Sep. 1, 1995, pp. 1272-1291, XP000526001.

El Hassouni et al., "HOS-Based Image Sequence Noise Removal" IEEE Transactions on Image Processing, vol. 15, No. 3, Mar. 2006, pp. 572-581.

He et al., "Low-Power VLSI Design for Motion Estimation using Adaptive Pixel Truncation," IEEE Transactions on circuits and systems for Video Technology, vol. 10, No. 5, Aug. 2000, pp. 669-678.

Kim at al., BI-Level Digital Video Coding, IEICE Trans. Commun., vol. E87-B, No. 3, Mar. 2004, pp. 786-791.

Lee, J-S, "Digital Image Smoothing and the Sigma Fitter," Computer Vision, Graphics, and Image Processing, Academic Press, Duluth, MA, vol. 24, Jan. 1, 1983, pp. 255-269, XP000199489.

Ojo et al., "An Algorithm for Integrated Noise Reduction and Sharpness Enhancement," IEEE Transactions on Consumer Electronics, vol. 46, No. 3, Aug. 2000, XP2194412.

Ojo et al., "Integrated Spatio-Temporal Noise Reduction with Implicit Motion Compensation," 2001 IEEE, pp. 286-287, XP002194413.

Ozkan et al., "Efficient Muitiframe Wiener Restoration of Blurred and Noisy Image Sequences," IEEE Transactions on Image Processing, vol. 1, No. 4, Oct. 1992, pp. 453-476.

Rajagopalan et al., "Motion Field Modeling for Video Sequences," IEEE Transactions on Image Processing, vol. 8, No. 11, pp. 1503-1516, Nov. 1977.

Russo, F., "A Method for Estimation and Filtering of Gaussian Noise In Images," IEEE Transactions on Instrumentation and Measurement, vol. 52, No. 4, Aug. 1, 2003, pp. 1148-1154, XP011101101.

Shin et al., "Block Estimation using Adaptive G Filtering," IEEE Transactions on Computer Electronics, vol. 51, No. 1, Feb. 2005, pp. 218-226.

Starck et al., "The Curvelet Transform for Image Denoising," IEEE Transactions on Image Processing, Vol. 11, No. 6, Jun. 2002, pp. 670-684.

Thornberg et al., Conceptual Interface and Memory-Modeling for Real-Time Image Processing Systems, 2002 IEEE, pp. 138-141.

Wang et al., "A Globally Adaptive Pixel-Decimation Algorithm for Block-Motion Estimation," IEEE Transactions on Circuits and Systems for Video Technology, vol. 10, No. 6, Sep. 2000, pp. 1006-1011.

Wang., "A Novel Adaptive Pixel Decimation for Boock Motion Vector Estimation," IEICE Trans. Commun., vol E82-B, No. 1, Jan. 1999, pp. 188-191.

International Search Report, dated Oct. 9, 2008.

* cited by examiner

AUTOMATIC PARAMETER ESTIMATION FOR ADAPTIVE PIXEL-BASED FILTERING

This application claims the benefit, under 35 U.S.C. §365 of International Application PCT/US2006/38184, filed on Sep. 28, 2006, which was published in accordance with PCT Article 21(2) on Apr. 10, 2008, in English and which claims the benefit of United States Provisional Patent Application No. 60/848,272, filed on Sep. 29, 2006, in English.

TECHNICAL FIELD

This disclosure relates to video filtering. At least one implementation relates, more particularly, to automatic parameter estimation for adaptive pixel-based spatiotemporal filtering.

BACKGROUND OF THE INVENTION

Video noise reduction filters have been extensively used in both post-production and video compression environments. The former often require filters which preserve as much detail as possible, and therefore tend to use very conservative settings which may lead to uneven noise removal over the picture. The latter often require high filtering strength, even at the expense of some loss in detail, because the goal is to reduce the amount of information in the video and thereby increase compression efficiency (that is, reduce bit rate). Various applications seek to achieve a balance between uneven noise removal and loss in detail.

SUMMARY

According to one general aspect, a criterion for filtering digital image data is accessed, and a value is determined for a parameter for use in filtering digital image data, the value being determined based on whether the value results in the criterion being satisfied for at least a portion of a digital image.

According to another general aspect, a digital image is filtered using a filter that includes a parameter having a value determined based on whether the value results in a user-supplied criterion being satisfied for a portion of the digital image.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations or an apparatus storing instructions for performing a set of operations. Other aspects and features will become apparent from the following detailed description considered in conjunction with the accompanying drawings and the claims. It is to be understood, however, that the drawings are designed solely for purposes of illustration and not as a definition of the limits of the present principles. It should be further understood that the drawings are not necessarily drawn to scale and that, unless otherwise indicated, they are merely intended to conceptually illustrate particular structures and procedures.

DETAILED DESCRIPTION

Figure 1:
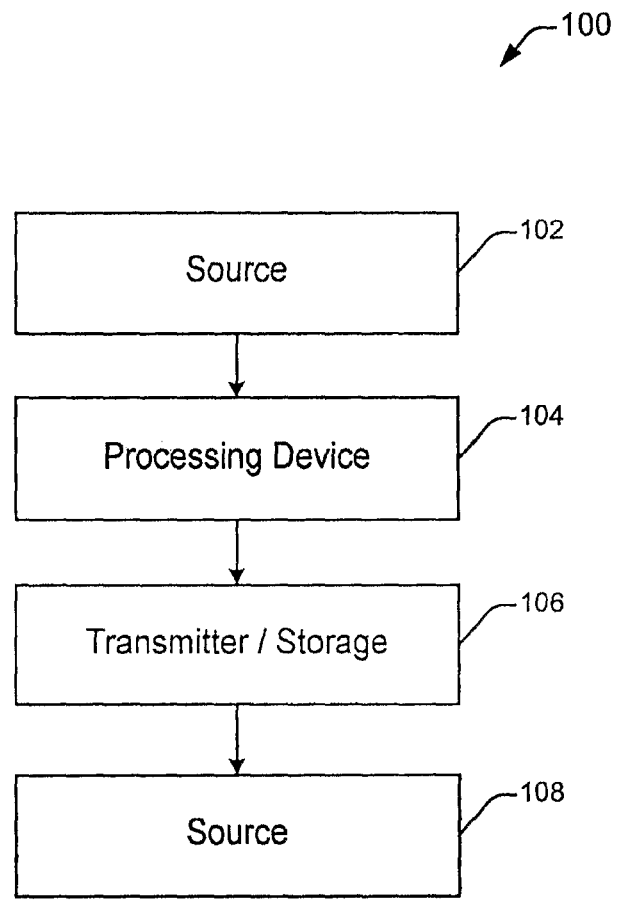
FIG. 1 is a block diagram of an implementation of a system for adaptive pixel-based spatio-temporal video noise filtering.

Described herein are, for example, video filtering methods that address two major problems associated with video noise removal: (a) loss of detail in the content; and (b) filtering artifacts, that is, artifacts introduced by the filtering process such as uneven noise removal. The lack of interaction in prior art systems between spatial and temporal filtering at the pixel level causes the strength of the filtering to vary from pixel to pixel, thus leading to the possibility of post-filtering artifacts arising from uneven filtering. Some challenges include designing noise reduction filters that provide a graceful tradeoff between the amount of noise reduction and the resulting loss of picture quality, as well as providing a user-friendly method of controlling this tradeoff.

These problems can be addressed by providing explicit interaction between spatial and temporal filtering. The explicit interaction is achieved by combining spatial and temporal filtering at the pixel level, while continuing to enforce an even amount of noise reduction across all pixels in a video and while keeping as much detail as possible. This is done by averaging each pixel with a constant number of temporally and spatially predicted pixels. Averaging each pixel with a constant number of other pixels may be particularly advantageous in the presence of additive noise, such as Gaussian noise, and is useful in the presence of other noise as well. Post-filtering artifacts are reduced or avoided by enforcing an even amount of noise reduction across all pixels in the video. Thus, spatial and temporal filtering are combined at the pixel level. This provides a significant advantage over known systems that either: 1) do not have explicit interaction between spatial and temporal filtering at the pixel level, or 2) switch between spatial or temporal filtering at the pixel level.

The "quality" of filtering relies on many parameters, particularly: 1) the thresholds used to verify the "goodness" of spatially or temporally predicted candidate pixels; 2) the size (radii) of the spatial neighborhood from which spatial candidates are obtained; and 3) the size (radii) for the temporal neighborhood from which temporal candidates are obtained. One problem has been that these thresholds and radii had to be manually specified, and users had to use a time consuming trial-and-error approach to arrive at parameters that resulted in good filtering quality. The present principles address this problem by, for example, providing a method and system for automatically estimating these parameters based on a higher-level user specifications that are intuitive to understand and independent of the content to process.

According to an implementation, at least one method of the present principles works in an iterative fashion: (1) allowing the user to enter two simple inputs; (2) creating the corresponding filter; (3) applying the filter to one or more digital images; (4) allowing the user to view the output; and (5) if the user does not like the output, then repeating steps 1-4 so that the user can change the two simple inputs. Such a system provides significant advantages to a user that needs to filter data. If a system requires that a user perform a trade-off between too many variables, then the system can become complex, time-consuming for the user. By targeting a small number of input variables, and selecting those variables in an intelligent manner (such as by selecting "strength" and "tolerance", which interact in a known and useful manner), a system is provided that allows a user to more quickly and easily design a filter that is appropriate for the data that needs to be filtered.

As mentioned above, the two inputs are "strength" and "quality" (for example, a percentage of tolerance for filtering). As used in the present disclosure, filtering "strength" specifies how much noise reduction will be performed (that is, the higher the filter strength, the higher the noise reduction), and "quality" refers to a tolerance measure that controls filtering uniformity and loss of detail (that is, the higher the tolerance, the lower the uniformity and loss of detail).

According to another implementation, the present principles could allow the user to provide one input (that is, either "strength" or "quality"). In this implementation, the other (non-user-selected) input will default to a predetermined value based on the user input for the selected input. A Look up table (LUT) or other stored database providing predetermined values in response to a single user input may be provided. For example, strength may be specified by a user, and tolerance may default to 0%.

At least one implementation described herein provides a filter design method that automatically estimates filter parameters while maintaining user-friendly control over the strength/quality tradeoff resulting from such filtering. This is a technical solution that addresses at least some of the technical problems discussed herein. Various technical advantages are provided, including, for example, simplified filter generation, more accurate control over the strength/quality tradeoff, and generating a filter in a reduced amount of time and processing.

Figure 7:
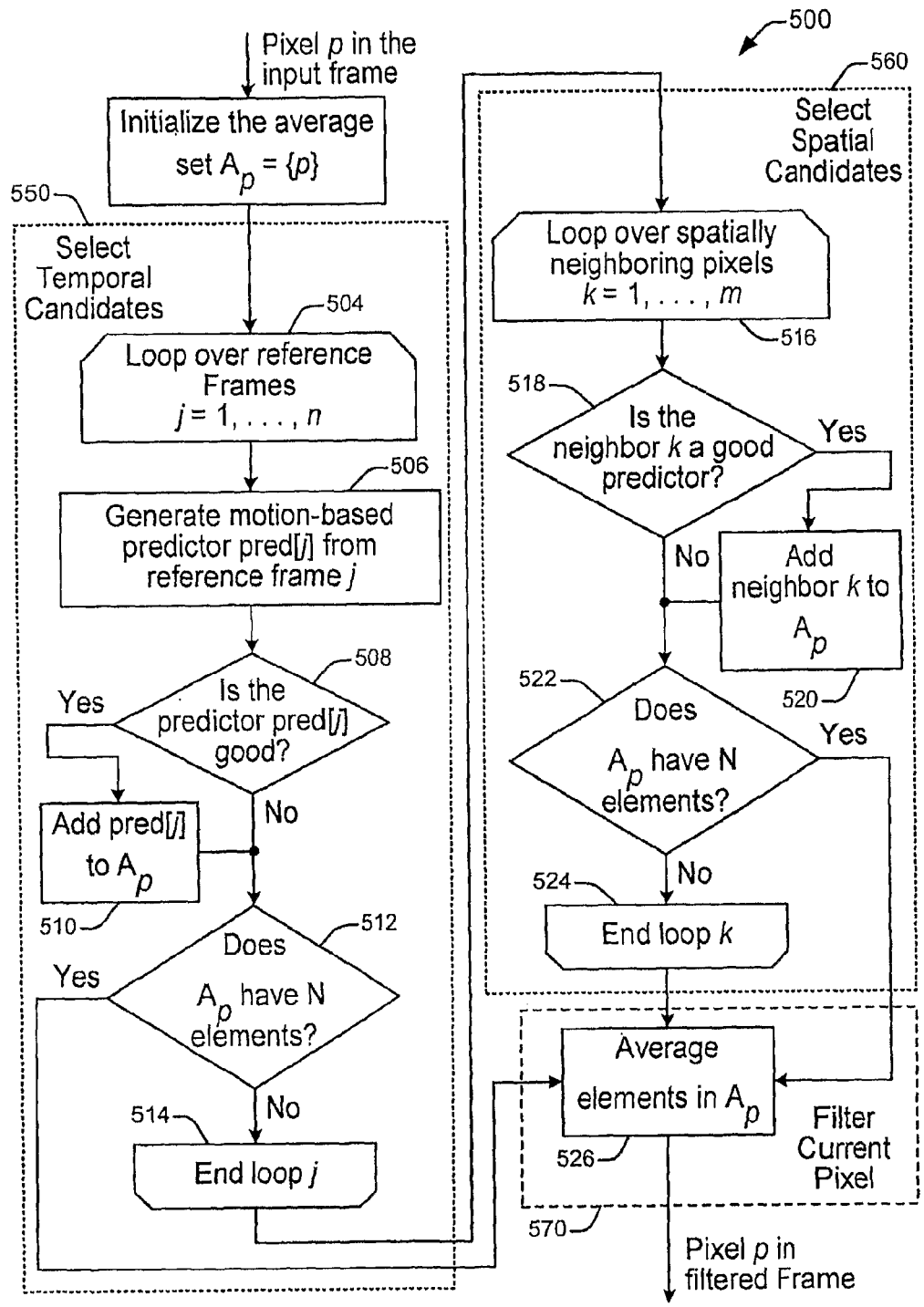
FIG. 7 is a flow chart showing an implementation of a method for adaptive pixel-based video noise filtering.
Figure 8:
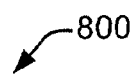
FIG. 8 is a diagrammatic representation of an implementation showing a 5×5 grid of spatially neighboring pixel candidates in the spatial filtering of a pixel p.
Figure 9:
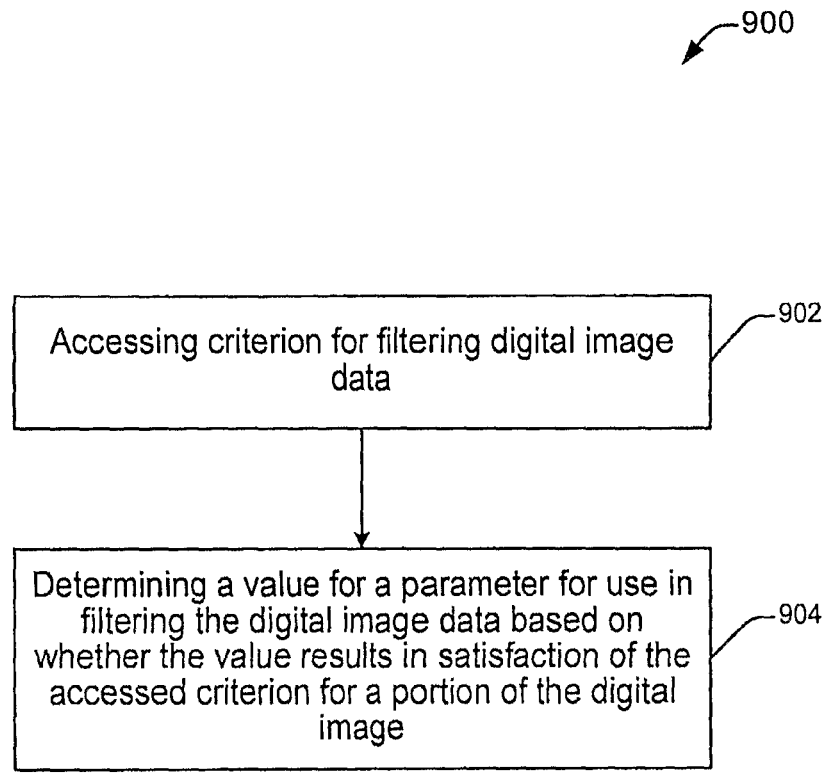
FIG. 9 is a flow diagram showing an implementation of automatic threshold estimation.

FIGS. 1-8 provide a description of pixel-based adaptive spatio-temporal filtering according to an aspect of the present principles. FIG. 9 shows a flow diagram of an implementation of a method for automatic threshold estimation according to the present principles. The method of FIG. 9 allows, for example, the estimation of the corresponding low-level parameters for the exemplary filtering process described in FIGS. 1-8. Those of skill in the art, however, will recognize that the method of FIG. 9 could be used in other image filtering environments and applications and is clearly not limited to the exemplary spatio-temporal filtering disclosed herein.

In the examples described in FIGS. 1-8, filtering "strength" most typically relates to the number of candidates used to filter each pixel, and filtering "tolerance" may specify, for example, the maximum percentage of pixels where filtering strength can be reduced. FIG. 1 shows a block diagram of a system 100. A source 102 of video information provides an input to a processing device 104. The processing device 104 conducts an adaptive pixel based spatio-temporal video noise filtering process, and passes the result to a transmitter and/or storage device 106 for transmission or storage. In the implementation shown, a display 108 receives the noise filtered video information from the transmitter 106 and operates to display the same. Those of skill in the art will recognize that display 108 can be replaced by other devices. For example, a receiver, such as a memory, can be adapted to receive the filtered video and, optionally, to pass the same on to other video processing devices.

Figure 2:
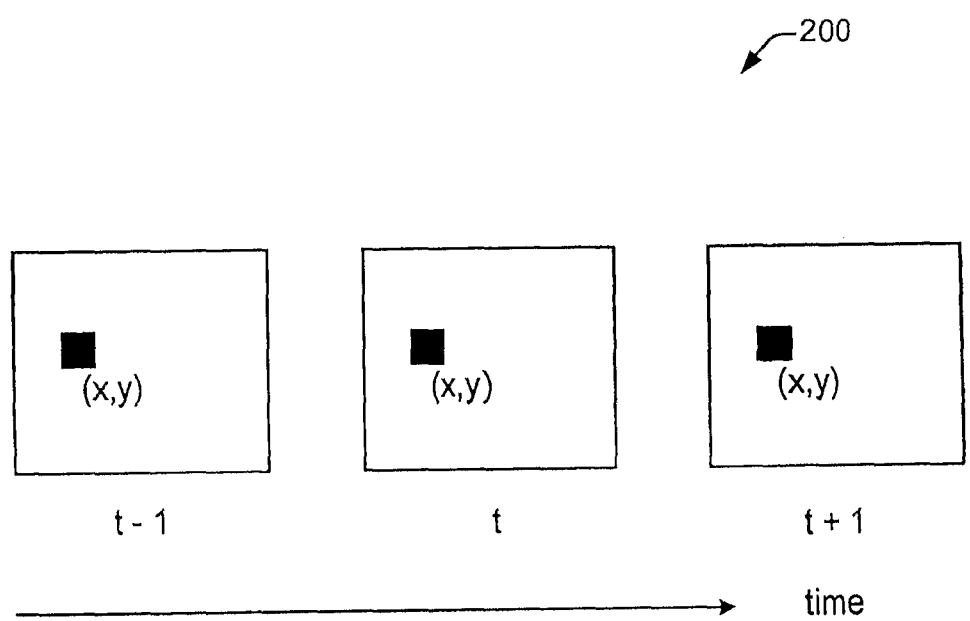
FIG. 2 is a block diagram of content provided by the source of FIG. 1 in an implementation.

FIG. 2 shows an exemplary diagrammatic representation of some source content 200 as provided by the source 102 to the processing device 104. The content is generated based on time and can be in the form of frames at a particular time t and the surrounding time based frames (for example, t−1, t+1, . . . ). Each frame contains a set of pixels indexed by its spatial location (x, y) in the frame.

Figure 3:
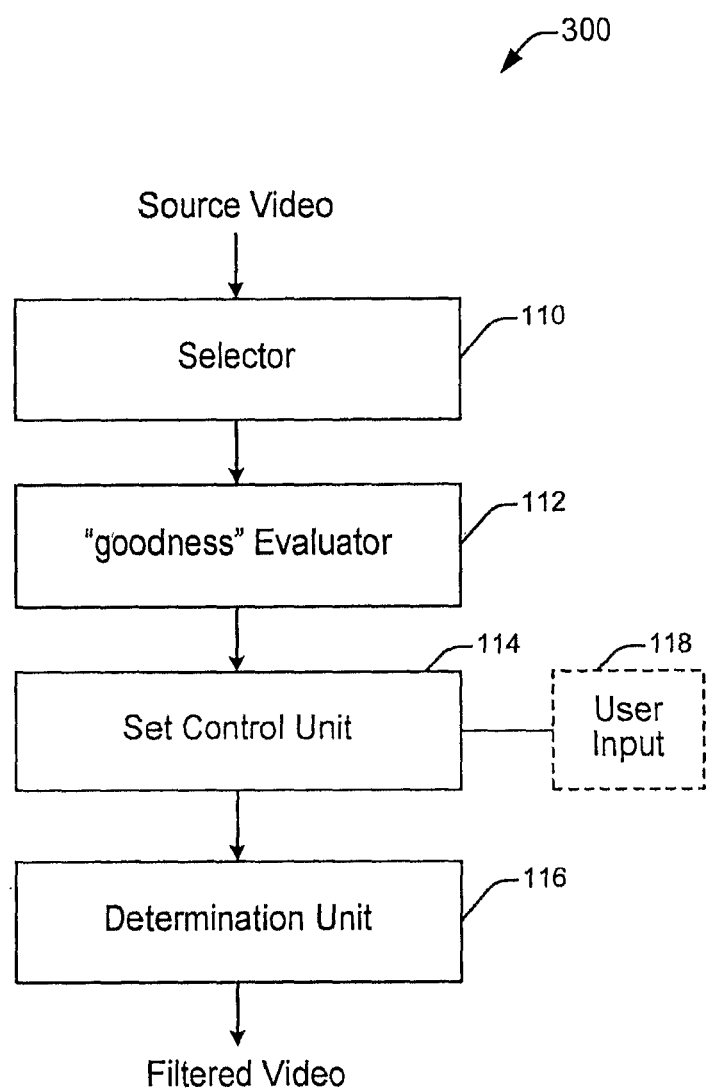
FIG. 3 is a block diagram showing an implementation of the processing device of FIG. 1.

FIG. 3 is a block diagram of an implementation 300 of the processing device 104. The input to the processing device 300 is the source video, and the output is the filtered video. The implementation shown in FIG. 3 may perform a variety of processes for one or more pixels in the source video, resulting in a substitute (that is, filtered) value for each of those pixels. Let the pixel for which the substitute value is being determined (or in other words, the pixel being filtered) be termed the current pixel and the frame it is drawn from, the current frame. For each current pixel, a selector 110 selects a set of candidate pixels from one or more reference frames. In one implementation, the reference frames are frames surrounding the current frame, and can also include the current frame itself. The selector 110 also may select the current pixel. An evaluator 112 determines a goodness value or quality metric of each pixel in the set of candidate pixels. According to various implementations, the goodness value or quality metric may be computed using, for example: 1) the color difference between a pixel and a selected candidate pixel; 2) the mean of absolute differences (MAD) between an M×N block around a pixel and an M×N block around a candidate pixel; or 3) the distance to the current pixel.

A set control unit 114 determines a corresponding set of pixels for the current pixel, based on the application of one or more criteria to the result of the evaluator 112. These criteria may determine: 1) whether or not one or more pixels from the candidate set, considered in a predetermined order, should be included in the corresponding set; and 2) when to stop including pixels from the candidate set in the corresponding set. The criteria for stopping the inclusion of the pixels from the candidate set in the corresponding set, in order of priority for one implementation, are: A) a predetermined number of pixels have been included in the corresponding set, or B) all the pixels in the candidate set have been considered. A determination unit 116 determines the substitute value for the current pixel based on the values of the pixels in the corresponding set.

A user input unit 118 is optionally included in the processing device 300, with the user input unit 118 being shown in FIG. 3 in a dashed box to further indicate that it is optional. The user input unit 118 may be used, for example, to allow a user to enter a stopping criteria such as a value of N where N may be the number of pixels included in the corresponding set of pixels for a current pixel. The user input unit 118 may be coupled to the set control unit 114 as shown in FIG. 3, or coupled (directly or indirectly) to one or more other components. In various implementations, the value of N may be, for example, fixed in software or hardware and not be adjustable by a user.

Figure 4:
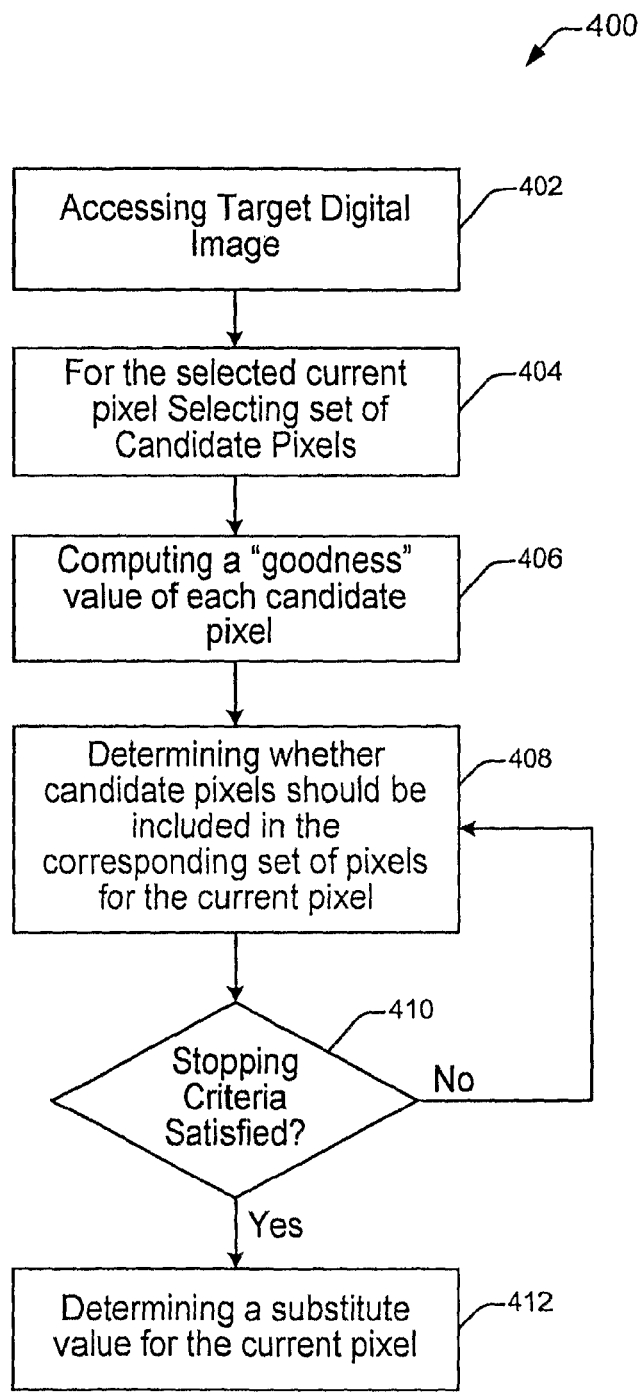
FIG. 4 is a flow chart showing an implementation of a method for video noise filtering using the system of FIG. 1.

FIG. 4 shows a flow diagram 400 of the processing according to an implementation. A target digital image of the source video is accessed 402 and a current pixel is selected. The source video of this implementation may include one or more of a variety of different video sources. The next operations 404-412 are performed for at least one pixel selected from the target image. For the selected current pixel, a set of candidate pixels are selected from one or more reference frames (which may or may not include the current frame) 404. Once a set of candidate pixels is selected, one or more goodness values (or quality metrics) of each candidate pixel is computed (406). At this point, a corresponding set of pixels for the current pixel is determined based on one or more criteria (408). The criteria may include, for example, whether the goodness value satisfies a threshold. Operation 408 may consider the one or more pixels from the candidate set in a predetermined order.

It is then determined whether a stopping criteria has been met (410). Again, as mentioned above, the stopping criteria can be, for example: A) a predetermined number of pixels have been included in the corresponding set; or, B) all the pixels in the candidate set have been considered. Once the stopping criteria is met, a substitute value for the current pixel is determined based on the values of the pixels in the corresponding set (412).

Figure 5:
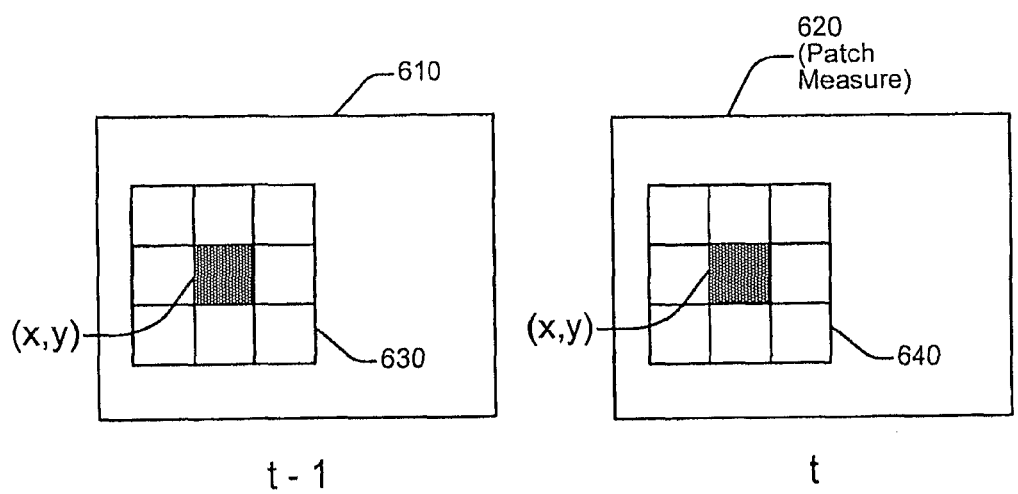
FIG. 5 is a diagrammatic representation of an implementation of a patch measure for determining good candidates.

Referring to FIG. 5, two adjacent frames 610 and 620 with 3×3 pixel patches 630 and 640, respectively, are shown. In accordance with an implementation, a patch based measure of "goodness" first computes the absolute differences between corresponding pixels in the two patches, and then takes the mean of these absolute differences to form a mean of absolute differences (MAD). The temporal predictor pred[j] is said to be "good", in this implementation, if the MAD between the pixels in the two patches is less than a predetermined threshold. Those of skill in the art will recognize that in practice, this threshold may be split into two thresholds, one for the MAD of the luma components of the pixels, and one for the MAD of the chroma components. It is important to note that: 1) the frames need not be adjacent (even though shown as adjacent in FIG. 5); and 2) the (x, y) locations of the pixels in the two frames need not be the same. One of ordinary skill in the art will be aware of various ways of selecting patches and thresholds.

Figure 6:
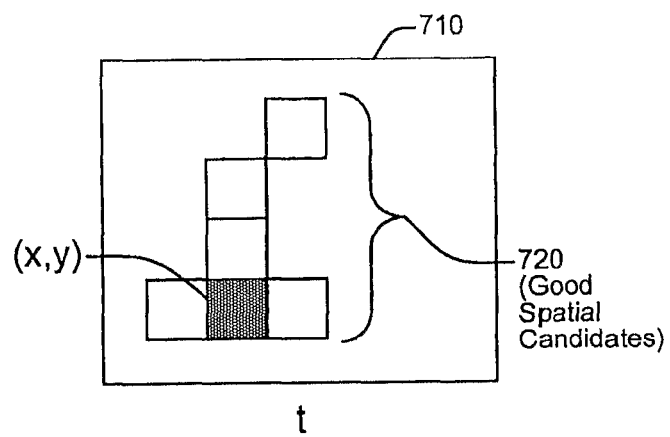
FIG. 6 is a diagrammatic representation of an implementation showing the selection of spatial candidates.

FIG. 6 is a diagrammatic representation showing a frame 710 with the current pixel (x,y) and the set of pixels 720 that have been chosen as "good" spatial candidates (that is, pixels in the spatial neighborhood that have "passed" the goodness criterion for spatial filtering). For example, one criterion is the difference between the values of the current pixel and the candidate pixel, and the difference may be compared to a threshold. If FIGS. 5 and 6 represent a set of pixels that pass the goodness test(s) for the temporal (FIG. 5) and the spatial (FIG. 6) domains, then N is equal to 7, reflecting 1 temporal pixel, 5 spatial pixels, and the target pixel.

FIG. 7 shows a flowchart of a process 500 for adaptive spatio-temporal video noise filtering according to one implementation. For filtering each pixel p in the input video frame, the goal of the process 500 is to find N "good" candidates for averaging p with (including itself in this implementation), where N is a constant throughout the filtering process 500. These "good" candidates are put in an averaging set $A_p=\{p, c_i; i=1, \ldots, M\}$, where $M \leq N-1$, and $M<N-1$ when enough "good" candidates are unavailable. The filtering process then involves replacing p by the average of the elements of $A_p$. Note, as used herein, the phrase "averaging pixels" refers to averaging the luma and chroma component values of the pixels separately (for example, Y, U, and V), although implementations need not perform the averaging separately. For implementations that do perform averaging separately on components, various other operations (or even the entire process) will typically or necessarily also be performed separately on the components.

In the process 500, the N "good" candidates may be chosen from the temporal or the spatial domain. According to one implementation, the N "good" candidates are first sought in the temporal domain since temporal filtering is less likely to blur visual details. As shown in FIG. 7, the process 500 includes three primary aspects: the selection of temporal candidates 550; the selection of spatial candidates 560; and the filtering by averaging the selected candidates 570. The process 500 filters each pixel using candidates selected from the temporal and/or spatial domains. This is contrary to various prior art methods that filter a whole frame at once, either spatially or temporally, and combine the results to provide the filtered frame.

Referring to the example shown in FIG. 7, the selection of temporal candidates 550 first involves estimating the motion of pixel p from the current frame to n reference frames. As shown, a pixel p from an input frame is used to initialize the averaging set $A_p=\{p\}$ (502). A loop over reference frames $j=1, \ldots n$ (504) is performed and the motion based predictor pred[j] is generated from the reference frame j (506). Thereafter, each temporally predicted pixel pred[j] (from the $j^{th}$ reference frame) is considered in turn as a candidate for $A_p$ (508). If it is determined to be a "good" predictor (that is, passes the quality metric criteria), it is added to the set $A_p$ (510). In the course of choosing temporal candidates, if $|A_p|=N$ (that is, the number of elements in $A_p$ equals IV) at 512, the process of seeking candidates is terminated, and we move on to the filtering step 570.

If, after selecting candidates from the temporal domain, $|A_p|<N$, the end loop j occurs (514), and we start looking for candidates in the spatial domain. One possibility is that we consider all pixels in a b×b neighborhood of p, as shown in FIG. 8. One of ordinary skill will be aware of various techniques for selecting the size of a neighborhood. The order in which we consider the spatial neighbors in the loop $k=1, \ldots, m$ (516) is determined by the proximity of the candidate pixel to p. If the candidate neighboring pixel is determined to be "good" (518), then it is added to $A_p$. If $|A_p|=N$ (522) while scanning spatial candidates, or all candidates have been scanned, we proceed to the filtering step 570.

Finally, in the filtering step 570, pixel p is replaced by the average (526) of the elements of $A_p$ and the process moves on to the next pixel to be filtered. Other operations in lieu of, or in addition to, averaging may be used to determine a replacement for the pixel p. More generally, an implementation may determine a replacement based on the values of the pixels in $A_p$, including but not limited to an average of those values. It should be clear that although the number N typically remains constant for each pixel in a target digital image, the relative locations of the N pixels may change for each pixel in the target digital image.

FIG. 8 shows a numbering 800 of a set of candidate pixels around a current pixel p. The numbering 800 assigns a number to the neighboring pixels based on spatial distance from, or spatial proximity to, the current pixel p. The four pixels labeled "1" have a common distance top and are the closest top. The four pixels labeled "2" have a common distance to p and are the second closest to p. The four pixels labeled "3" have a common distance top and are the third closest to p. The eight pixels labeled "4" have a common distance to p and are the fourth closest top. The four pixels labeled "5" have a common distance top and are the fifth closest top. The numbering 800 may be used to determine which pixels to test first while building the corresponding set of pixels for p. For example, an implementation considers all "1" pixels, then all "2" pixels, then all "3" pixels, then all "4" pixels, and then all "5" pixels until the corresponding set has N pixels. This is in contrast, for example, to considering all pixels in a raster order such as left to right and top to bottom.

The "distance" approach of FIG. 8 may be applied to temporal candidates in other frames as well. One implementation uses a "temporal distance," rather than the spatial distance of FIG. 8, and "temporal distance" may be replaced with "frame distance" in an implementation that uses frames. For example, for current pixel p in frame j, an implementation considers first pred[j−1] (the prediction for p in frame j−1), then pred[+1], then pred[j−2], then pred[j+2], etc., in an order of increasing frame distance.

Implementations may evaluate candidate pixels in the spatial domain prior to, or to the exclusion of, evaluating candidate pixels in the temporal domain. Other domains also may be used. Such other domains may include, for example, transform domains (for example, Fourier, wavelet), and domains taken from a separate recording of the same image(s). For example, in one implementation involving video taken from film reels, domains are extracted from the same video digitized from a different film reel. The other film reel may be particularly useful if the other film reel has similar film grain (noise, more generally) characteristics as a first film reel.

Implementations may include filtering one or more of a variety of sources or inputs. Such sources include, for example, video or a still image.

The selection of "N" may be based on the amount of noise that is desired to be removed. "N" may vary, for example, for different frames (for example, N may be set for a given sequence of frames covering a scene), for different regions within a frame, and for different components or separations (for example, luminance may have a different "N" than chrominance, or different color separations such as R, G, and B or Y, U, and V may have different values of "N").

Further, a user may select N based on experience, and an implementation may allow the user to enter a value for N using a user interface. The user interface may include, for example, a mechanical device (for example, a switch or a knob), a computer device (for example, a keyboard or a mouse, in possible cooperation with a pull-down menu or a display of the selected value), or a voice input system.

A user may select one or more values for the size of a corresponding pixel set. The one or more values may be a range, for example, with closed or open ends. Examples include, (i) N plus or minus X, (ii) greater than N, and (iii) less than N, where N and X are fixed. In various implementations in which the size is selected (or hard-coded) as "greater than N," as long as there are N pixels in the corresponding set, then the corresponding set may be considered complete. For various implementations having a maximum for the number of pixels that can be in a corresponding set of pixels, a user may select (or a system may have hard-coded) a predetermined maximum number for the number of pixels that may be included in a corresponding set of pixels.

Many implementations use a predetermined threshold in determining how many pixels are to be in a corresponding set of pixels. A predetermined threshold may be referred to, depending on the implementation and use of the predetermined threshold, as a predetermined minimum or a predetermined maximum. A predetermined threshold may serve as a stopping point in various implementations.

Goodness or quality metrics may vary. Further, the described MAD may be used for spatial domains, and the described difference-of-pixels may be used for temporal domains.

Implementations need not do motion estimation. Such implementations may assume zero motion in determining pred[j], for example.

According to a further implementation, determining a corresponding set of pixels includes selecting a pixel among a set of candidate pixels from the set of reference images, computing a quality metric for the selected candidate pixel, adding the candidate pixel to the corresponding set of pixels if the quality metric satisfies one or more predetermined criteria, and repeating said selecting, computing and adding until one or more stopping criteria are met.

In accordance with various implementations, a quality metric can be, for example: 1) the color difference between a pixel and a selected candidate pixel; 2) the mean of absolute differences between a M×N block around a pixel and a M×N block around a candidate pixel; or, 3) distance to the current pixel.

In a further implementation, computing a substitute value can include: 1) averaging the values of the pixels in the corresponding set of pixels; and/or 2) a weighted average of the values of the pixels in the corresponding set of pixels. In this implementation, the pixels are weighted in the corresponding set of pixels based on the value of the quality metric of each pixel. The averaging performed by the determination unit can be performed on the Y, U and V values (or another separation of colors) of the pixels separately.

In another implementation, each color component of each pixel is independently processed, and the number of pixels in the corresponding set of pixels is used as a stopping criterion.

In yet further implementations, an apparatus for filtering video includes a selector to select, for each of multiple pixels from a target digital image, pixels for possible inclusion in a corresponding set of pixels, an evaluator for computing a goodness value of a selected pixel, a set control unit determining the corresponding set of pixels based on the computed goodness value, for at least one of the multiple pixels, and a determination unit to determine, for each of the multiple pixels, a corresponding substitute value based on values of the pixels in the corresponding set of pixels.

According to some other implementations, the selected pixels are contained in one or more digital images where the one or more digital images possibly include the target digital image. The set control unit can also determine the corresponding set based on predetermined criteria. The predetermined criteria for the set control unit include whether or not one or more pixels from the candidate set, considered in a predetermined order, should be included in the corresponding set. In addition, the control unit further includes stopping criteria for stopping processing of the pixels. In one implementation, the stopping criteria include determining whether a predetermined number of pixels have been included in the corresponding set. In another implementation, the stopping criteria include determining whether all pixels in the candidate set have been considered.

In further implementations, the set control unit controls the size of the corresponding sets such that each corresponding set includes N pixels, unless the stopping criterion is satisfied prior to including N pixels. Yet in a further implementation, the locations of the N pixels in one corresponding set (that corresponds to one pixel) are different from the locations of the N pixels in another corresponding set (that corresponds to another pixel).

The selection of the corresponding pixel set by the set control unit can include pixels from multiple domains. In addition, the selection of pixels can be performed, by way of example, in a spiral order of increasing distance. The distance can be, for example, a spatial distance in a spatial domain and/or distance in the temporal domain, such as, for example, the orders described with reference to FIG. 8.

As will be appreciated by those of skill in the art, the method 500 disclosed in FIG. 7 has proven to be quite effective in removing noise while preserving detail and avoiding the introduction of artifacts. However, this method requires that certain parameters, such as the spatial and temporal neighborhood size and thresholds for verifying the "goodness" of candidates be manually set. As mentioned earlier, for inexperienced users, this manual selection may require a trial-and-error process to arrive at parameter values that result in the desired filtering "strength" and filtering "quality". Furthermore, even experienced users would typically be required to manually adjust filtering settings each time a different clip is processed because, depending on the characteristics of the clip, different filtering parameters are generally needed to achieve the same filtering "strength" and filtering "quality".

The present principles also propose various implementations to automatically estimate these thresholds for verifying goodness based on two intuitive (high level), user-specified parameters: filtering "strength" and "quality" (that is, tolerance of inadequate filtering). Filtering strength specifies how much noise reduction will be performed, while filtering quality controls the balance between filtering uniformity and loss of detail (that is, the higher the tolerance, the lower the uniformity and loss of detail). For the filter implementation of FIGS. 1-8, the filtering "strength" relates most typically to the number N of candidates used to filter each pixel, and filtering "quality" or tolerance may specify, for example, the maximum percentage of pixels for which the filtering strength can be reduced (that is, for which the filtering strength need not be achieved).

In order to guide, for example, an automatic threshold and radius estimation towards estimating parameters for the desired filtering behavior, the two high-level parameters are used. In the following implementation, "strength" refers to the filtering strength, specifically the desired number of pixel candidates, say N, to average over while filtering each pixel. The more candidates each pixel is averaged over, the greater the "strength" or the greater the noise removal. "Quality" refers to the acceptable percentage (that is, tolerance percentage level), referred to as "$\alpha$", of inadequately filtered pixels, that is pixels that do not have at least N candidates to average with. For example, $\alpha=5\%$ means that we shall try to choose thresholds such that no more than 5% of pixels are inadequately filtered. A lower tolerance drives the thresholds higher, thereby forcing more pixels to be adequately filtered at the expense of possibly blurring detail. A higher tolerance generally goes easier on fine details (that is, generally does not impair the fine details as much) by allowing more pixels to be less filtered.

The following provides examples for estimating spatial and temporal neighborhood size. Those of skill in the art will recognize that other methods for estimating the spatial and temporal neighborhood sizes may be utilized without departing from the spirit of the present principles.

Estimation of Spatial Neighborhood Size

A pixel in the sequence is represented as $p(x, y, t)$, where x and y are the spatial coordinates and t is the frame (time) index. The spatial neighborhood of a pixel p is the set of all pixels in a square window around p. Mathematically, the spatial neighborhood of $p(x, y, t)$ is given by $$N_r^s(p(x,y,t)) = \{p(x+i, y+j, t); i=\pm 1, \ldots, \pm r; j=\pm 1, \ldots, \pm r\}.$$

The value r is termed the radius of the neighborhood. The neighborhood is then called the r-neighborhood of p.

In an exemplary implementation, the spatial neighborhood size is estimated as follows. Given the filtering strength N, the smallest positive integer r is chosen such that the neighborhood contains at least 2N pixels, that is, $$\min_{r \in Z} \lceil r^2 - 1 \rceil \geq 2N$$

(where $\lceil \cdot \rceil$ denotes the ceiling operator). This ensures that there are enough candidates in the neighborhood to choose N "good" candidates from. If the desired luma and chroma filtering strengths, $N_Y$ and $N_C$, are different, their corresponding radii, $r_Y$ and $r_C$, may also be different. Note that the ceiling operator is not needed when "r" is an integer.

Different implementations may use different limits when estimating r, allowing for larger window sizes (3N, 4N, etc.) or smaller window sizes (N, or even smaller). Larger windows could be used when working, for example, with very high resolution imagery; smaller windows could be used, for example, to reduce computational cost.

Estimation of Temporal Neighborhood Size

The size of the temporal neighborhood can be estimated in a similar manner. The temporal neighborhood of a pixel p from frame at time t is the set of collocated pixels from frames around time t. Mathematically, the temporal neighborhood of $p(x, y, t)$ is given by $$N_r^T(p(x,y,t)) = \{p(x,y,t+k); k=\pm 1, \ldots, \pm r\}.$$

In an exemplary implementation, the temporal neighborhood size is estimated as follows. Given the filtering strength N, we choose the smallest positive integer r such that the neighborhood contains at least N pixels, that is, $$\min_{r \in Z} \lceil 2r \rceil \geq N$$

(where $\lceil \cdot \rceil$ denotes the ceiling operator). This ensures that there are enough candidates in the neighborhood to choose N "good" candidates from. Note that the ceiling operator is not needed when "r" is an integer.

As in the spatial case, different applications can use different limits when estimating r. It is also possible to use motion compensated pixels instead of collocated pixels when defining the temporal neighborhood of p. Additionally, in various implementations the temporal neighborhood includes pixels surrounding the collocated pixels in the other frames. Further implementations use multiple different algorithms for estimating motion, and include in the temporal neighborhood the various motion estimates that are produced.

FIG. 9 shows a flow diagram of a method 900 for automatic estimation of parameters for a desired filtering behavior. The criterion for filtering digital image data is first accessed (902). The criterion here is a filter design criterion (for example, "quality" and/or "strength") that is generally provided by a user in the form of a direct user input. This user input can be unsolicited, or could be queried from the user by the system upon initiation of the same.

However, the "accessing" of the criterion cannot only come from a user input, but may alternatively be provided by a software routine that returns a value/variable, or could be in the form of retrieving the criterion from a buffer or other memory location, either resident or non-resident memory, depending on the application. "Accessing" is a broad term, including, for example, obtaining, retrieving, receiving, manipulating, or processing in various manners.

Once the criterion for filtering has been accessed, the system determines a value (for example, a threshold) for a parameter for use in filtering the digital image (904). This determination is based on whether the determined value results in the satisfaction of the accessed criterion for at least a portion of the digital image.

Figure 10:
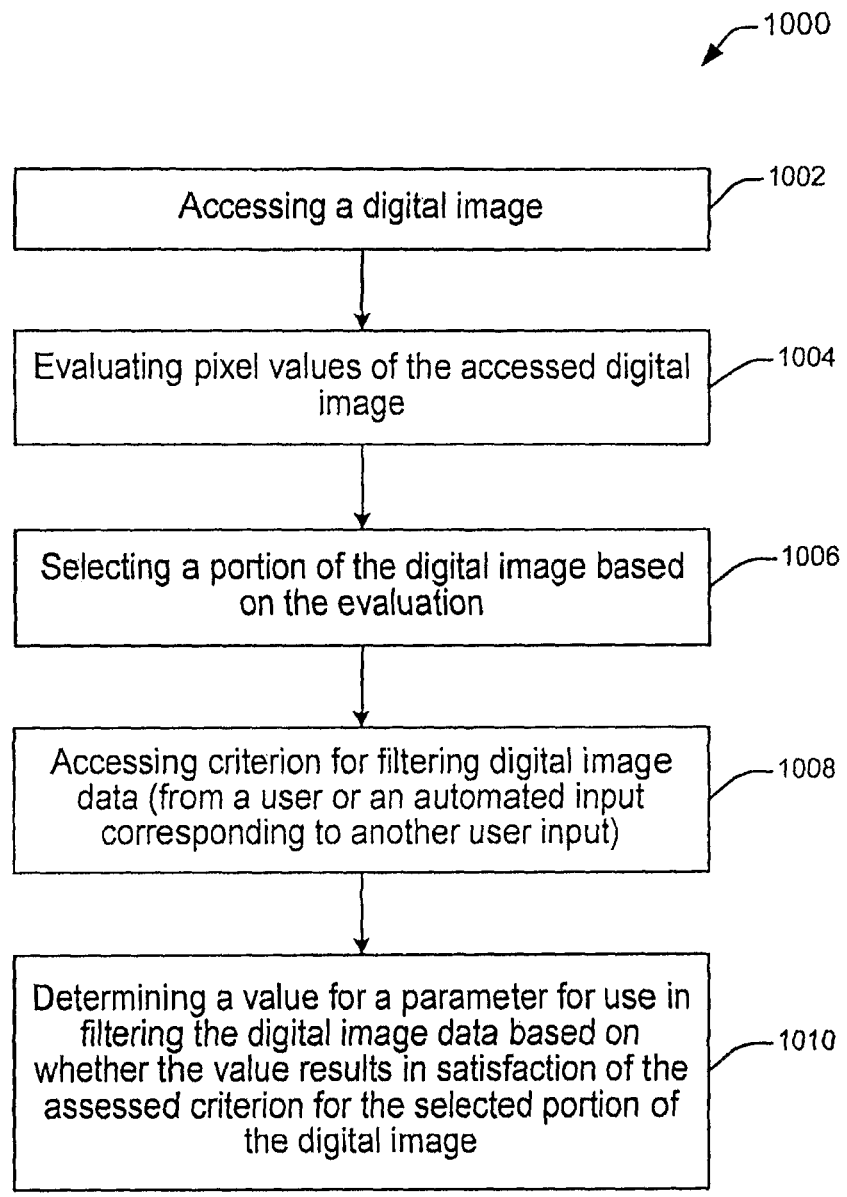
FIG. 10 is a flow diagram showing a further implementation of automatic threshold estimation.

FIG. 10 shows a flow diagram of another implementation, a method 1000, for automatic estimation of parameters for a desired filtering behavior. Initially, a digital image is accessed (1002) or provided. Pixel values of the image are evaluated (1004) and a portion of the digital image is selected (1006) based on the evaluation. Once the portion of the digital image is selected, the criterion for filtering the digital image is accessed (1008). As with the previous implementation, once the criterion is accessed, a value is determined for a parameter for use in filtering the digital image (1010). This determined value is one that results in the satisfaction of the accessed criterion for the selected portion of the digital image.

Figure 11:
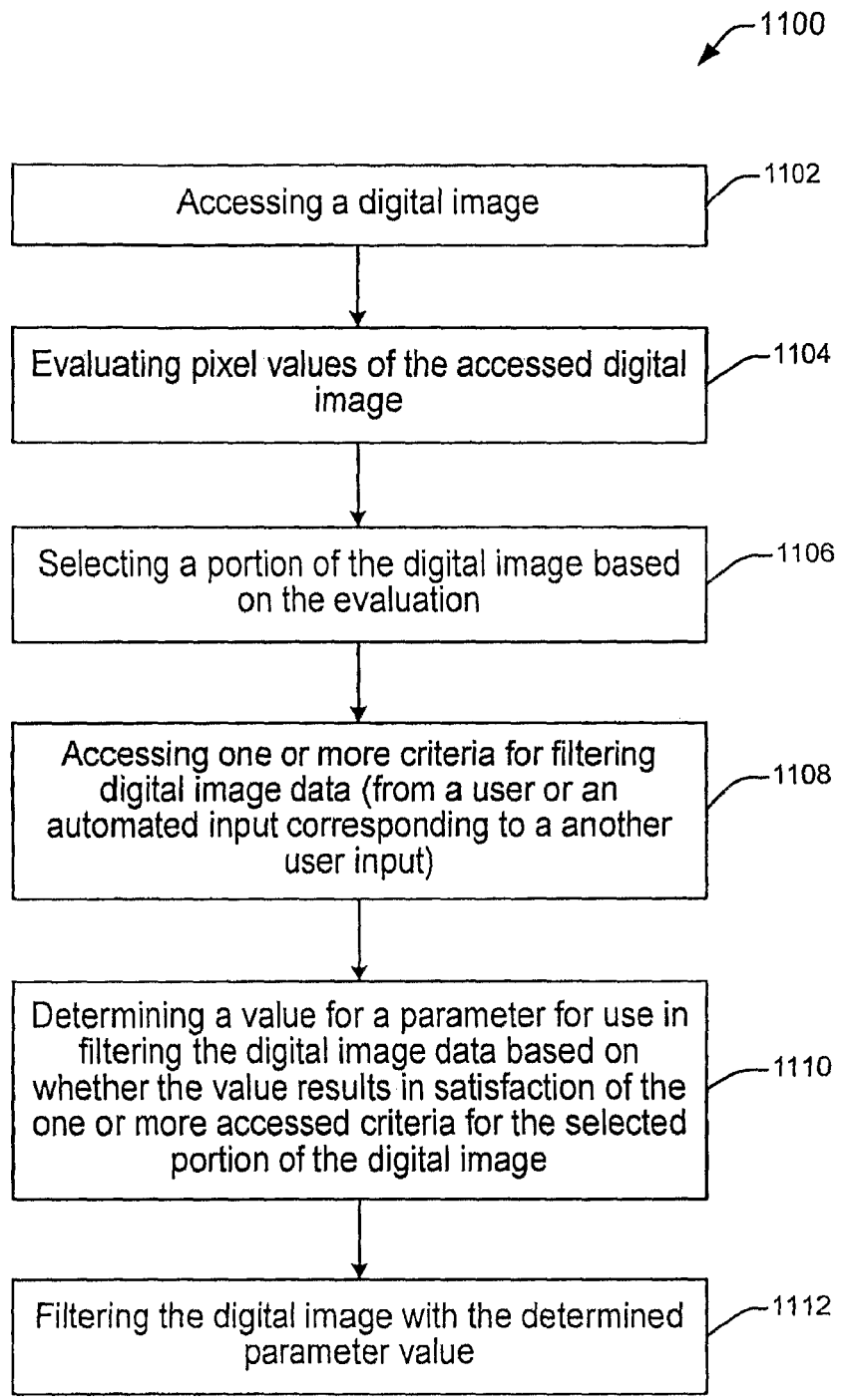
FIG. 11 is a flow diagram showing another implementation of automatic threshold estimation.

FIG. 11 shows a flow diagram of another implementation, a method 1100, for automatic estimation of parameters for a desired filtering behavior. As with the implementation of FIG. 10, a digital image is accessed (1102), and the pixel values of the image are evaluated (1104). A portion of the digital image is selected (1106) based on the evaluation. Once selected, one or more criteria for filtering the digital image data are accessed (1108). Once the one or more criteria has been accessed, a value for a parameter for use in the filtering is determined (1110) based on whether the value will result in the satisfaction of the one or more access criteria for the selected portion of the digital image. The image is then filtered with the determined parameter value (1112).

According to one implementation, three parameters are estimated per color component: 1) the size of the spatial neighborhood ($r^S$) from which spatial candidates are obtained; 2) the size of the temporal neighborhood ($r^T$) from which temporal candidates are obtained; and 3) a threshold (T) used to verify the "goodness" of spatially or temporally predicted candidate pixels. In an exemplary implementation, where two chroma components are treated jointly, a total of six parameters have to be estimated: the luma and chroma neighborhood radii ($r^S_Y, r^S_C$) of the spatial neighborhoods, the luma and chroma neighborhood radii ($r^T_Y, r^T_C$) of the temporal neighborhoods, and the luma and chroma thresholds ($T_Y$, $T_C$). In this case, parameters are estimated separately for luma (Y) and chroma (U, V) components. Other implementations treat U, V, and Y separately, resulting in nine parameters. Still other implementations treat U, V, and Y together, resulting in three parameters.

Figure 12:
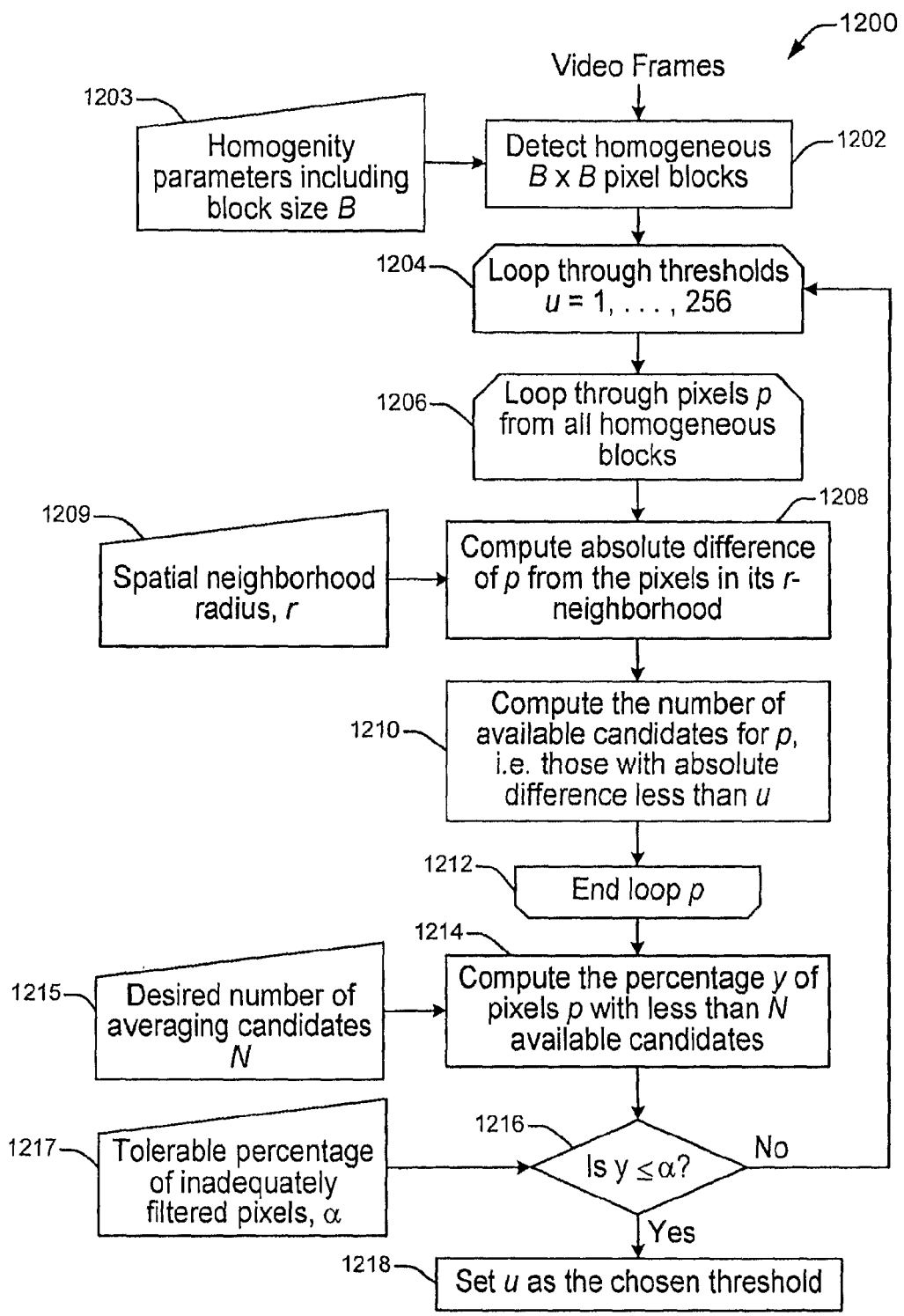
FIG. 12 is a flow chart showing an implementation of automatic threshold estimation.

Referring to FIG. 12, there is shown a flow diagram of a method 1200 for automatic estimation of parameters for a desired filtering behavior. This method is generally applied separately to the luma and chroma components of the sequence. For purposes of this example, we will assume we are operating on the luma component.

The following description provides a summary of the method 1200. To determine the luma threshold, the implementation selects a group of pixels, typically selected from several different images including the target digital image. The group of pixels may be drawn from, for example, an entire scene, the first ten (for example) frames of a video, or every one-hundredth frame of a video. The selected pixels preferably have very similar pixel-values (such as blue sky). The selected group of pixels is called a homogeneous region. The pixels in the homogeneous region are assumed to represent the target digital image, or at least to represent the noise in the target digital image. So if we develop a threshold that works for the homogeneous region, then that threshold will be assumed to work for the target digital image. For the homogeneous region, we look at every pixel in the region, and determine the smallest threshold for which no more than "alpha" percentage of the pixels in the region fail to have at least "N" pixels satisfying the threshold. That is, at least 100-"alpha" percentage of the pixels in the region each have "N" other pixels with pixel-values that are within the threshold from their own pixel-value. Once the threshold(s) is/are determined (based on the inputs for strength and quality), the filter may be run on the actual target data.

Referring again to the method 1200, to begin, we receive (or access, more generally) video frames. From the video frames we detect, at most, M homogeneous blocks of a fixed size of B×B pixels (1202). Homogeneous blocks are those that (after the mean value is subtracted) contain only the noise pattern that is to be removed. The homogeneity parameters including block size B can be provided from an external storage source (1203). One way of detecting homogeneous blocks is to first apply a light spatial filter on the sequence, such as an averaging filter, to remove some noise. Then, scan all B×B blocks (overlapping or not, for example), and retain those blocks having a variance that is less than a threshold $T_{homog}$. The values M, B and $T_{homog}$ could be, for example, preset for a system.

By way of example, let the set H contain all the pixels in the detected homogeneous blocks. Now all the possible thresholds, u=1, . . . , 256 are considered in order (1204), where u is the current value of the threshold. Once considered, a loop through all pixels p from all homogeneous blocks is performed (1206). The absolute difference of p from the pixels in its r-neighborhood is then computed (1208). The r-neighborhood (spatial neighborhood) is used to reduce processing complexity and time. Other implementations also (or alternatively) consider the temporal neighborhood, but this typically requires estimating motion which can be time and processor intensive.

The spatial neighborhood radius r can be provided from an external source (1209), such as a user input, or a computer generated input based on other user inputs. In one implementation, the neighborhood radii are computed as previously described, and the radii values are then input into the threshold estimation method to produce the respective parameters. When the radii are set by a user based on some computational considerations, they are thereafter input into the threshold estimation procedure. In the present example, the radius is shown as a square (FIG. 8), however those of skill in the art will recognize that the spatial neighborhood structure may be a shape other than a square. For example, the spatial neighborhood structure can be a circular neighborhood. Accordingly, the parameter defining the neighborhood size may vary. For each pixel p∈H, the number $n_{p,u}$ of neighbors q∈$N_{r_Y}$(p) (that is, available candidates) that satisfy the constraint |$p_Y$−$q_Y$|<u are found (where the subscript Y refers to the luma or Y value of the pixel) at operation 1210. The loop p is then ended (1212).

After scanning all pixels p∈H, the next operation (1214) is to determine (for example, by computing) the percentage y of pixels p in H that are not adequately filtered, that is, having less than N available candidates. N is the desired number of averaging candidates and may be provided by a user input (1215). In other implementations, the desired number of averaging candidates N can be automatically generated in response to other user inputs (for example, a user may input a desired resolution in a higher user level format such, as for example, 720i, 1080i, or 1080p). By way of example, one approach is to have a look up table (LUT) between a user setting and the corresponding N. In this exemplary implementation, the user may specify what film stock was used and the LUT may provide the appropriate N to reduce film grain.

If $y \leq \alpha$ (1216), then the procedure 1200 is terminated and the luma threshold, $T_Y$, is set to u (1218). Otherwise, u is increased by one and the new threshold u+1 is evaluated in the same way starting again at operation 1204. As mentioned above, the tolerable percentage of inadequately filtered pixels $\alpha$ is a "quality" level that is input by the user at operation 1217.

Note that the process 1200 produces one or more thresholds. Earlier implementations specified the use of the three parameters of spatial radius, temporal radius, and the one or more thresholds. As described above, the two radii are computed, in those implementations, based on N. Accordingly, after performing the process 1200, all of the parameters are available for design and application of the filter.

The procedure for the chroma components is the same, except for the evaluation of the threshold constraint. Here, a pixel p is said to be adequately filtered if at least N neighbors $q \in N_{r_C}(p)$ exist, such that the absolute difference of p for both chroma values are both less than u (that is, $|p_U - q_U| < u$ and $|p_V - q_V| < u$). Here, the subscripts U and V refer to the chroma (U and V) values of the pixels. In a different implementation, each chroma component is processed independently. In accordance with other implementations, the chroma thresholds $T_C$ are split into two thresholds $T_U$ and $T_V$ by treating the U and V components independently.

Note that the parameter(s) determined by the process 1200 (for example) are applied, in one implementation, in a filter that is applied to the target data. If the homogeneous regions were representative of the target data, then the strength and quality criteria are expected to be satisfied, but this is not necessarily guaranteed. Other implementations, however, do guarantee such satisfaction and modify the parameters to satisfy the thresholds.

Figure 13:
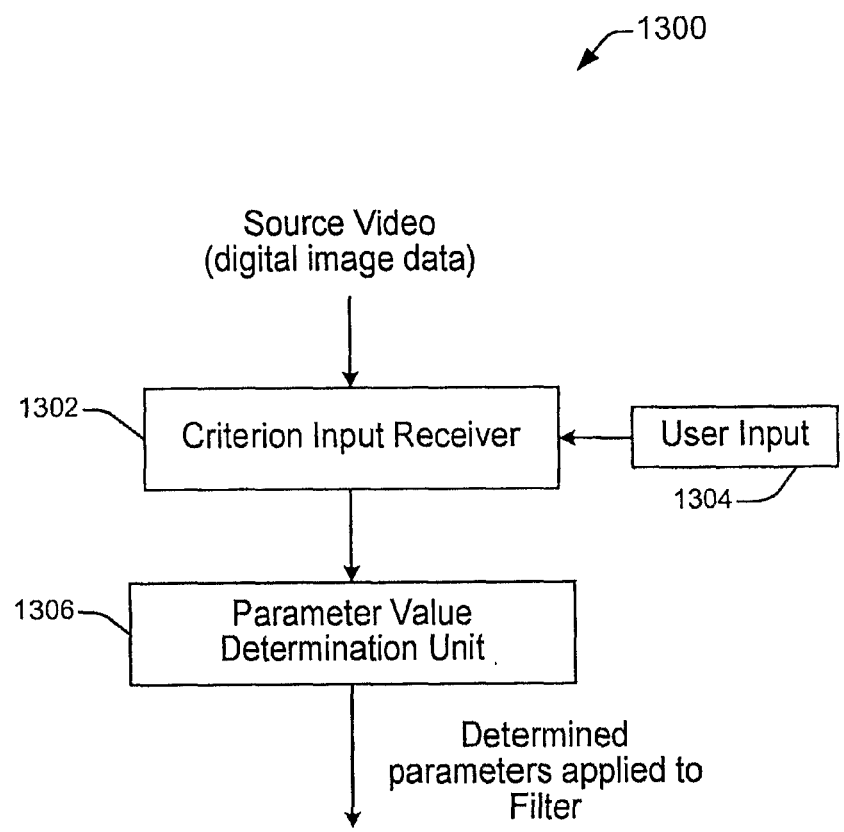
FIG. 13 is a block diagram of an implementation of the processing device of FIG. 1.

FIG. 13 shows a block diagram of an implementation 1300 of processing device 104 of FIG. 1. A criterion input receiver 1302 receives the user specified criterion from a user input device 1304. The criterion input receiver 1302 is configured to access a criterion, and may include, for example, a processor programmed to retrieve a user-supplied input criterion. The user input device 1304 may be, for example, a keyboard or a mouse coupled to an application program that allows a user to provide input by using the keyboard or the mouse.

The criterion input receiver 1302 sends the source video and received specified criterion to a parameter value determination unit 1306. The parameter value determination unit 1306 determines (for example, by calculating) one or more respective parameter values based on the received criterion and outputs the determined parameter value(s) for application to the filter. The parameter value determination unit 1306 may operate, for example, according to the method 1200 to determine the parameter value(s). One parameter value is the threshold, as described in the discussion of the process 1200.

Other implementations allow a user to specify different criteria for Y, U, and/or V components. In one implementation, the strength and quality criteria are more stringent for the luma component than for the chroma components. Applications may also provide more than two criteria.

Further yet, implementations may design a different filter (determine different parameter(s)) for various portions of an input video, such as, for example, by determining different parameter(s) for every scene in a video. This may be particularly useful because noise, and noise perception, can vary based on factors such as intensity. For example, film grain and camera noise typically vary based on intensity. Additionally, the human eye typically perceives more noise in medium intensity, as opposed to either high or low intensity.

Those of skill in the art will recognize that the processor configuration of FIG. 13 and corresponding method of the present principles can be implemented at the encoder or decoder side of a video transmission system. At the encoder side, in one implementation, the filter parameters are transmitted along with the video such that the decoder may filter received data without having to include processing capability for determining filter parameters. At the decoder side, in one implementation, the video source is the received video transmission without previously determined filter parameters. In yet other implementations, the filter parameters are determined at the encoder and the filter is applied at the encoder to reduce noise (such as, for example, spots caused by dirt on a camera lens) before encoding, distribution, transmission, and/or storage. Additionally, or alternatively, the filter parameters may be determined at the decoder and the filter may be applied at the decoder.

The implementations described include, for example, various systems and processes. Implementations may include one or more devices configured to perform one or more processes. A device may include, for example, discrete or integrated hardware, firmware, and software. A device may include, for example, a processor, which refers to processing devices in general, including, for example, a microprocessor, an integrated circuit, or a programmable logic device.

A device also may include one or more computer readable media having instructions for carrying out one or more processes. The computer readable medium may include, for example, a storage device such as, for example, a hard disk, a compact diskette, a random access memory ("RAM"), or a read-only memory ("ROM"). A computer readable medium also may include, for example, formatted electromagnetic waves encoding or transmitting instructions. Instructions may be, for example, in hardware, firmware, software, or in an electromagnetic wave. Instructions may be found in, for example, an operating system, a separate application, or a combination of the two. A processor may be characterized, therefore, as, for example, both a device configured to carry out a process and a device including computer readable media having instructions for carrying out a process.

As should be evident to one of skill in the art, implementations may also produce a signal formatted to carry information that may be, for example, stored or transmitted. The information may include, for example, instructions for performing a method (for example, the process 1200), or data produced by one of the described implementations (for example, one or more parameters as determined by the process 1200).

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program).

It is to be understood that the present principles may be implemented in various forms of hardware, software, firmware, special purpose processors, or a combination thereof. Many implementations use a combination of hardware and software. Moreover, the software may be implemented as an application program tangibly embodied on a program storage device. The application program may be uploaded to, and executed by, a machine comprising any suitable architecture. The machine may be implemented on a computer platform having hardware such as one or more central processing units (CPU), a random access memory (RAM), and input/output (I/O) interface(s). The computer platform also may include an operating system and microinstruction code. The various processes and functions described herein may be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present principles.

While there has been shown, described, and pointed out fundamental novel features as applied to particular implementations, it will be understood that various omissions, substitutions, and changes in the form and details of the methods described and devices illustrated, and in their operation, may be made by those skilled in the art. For example, it is expressly intended that all combinations of those elements and/or method operations which perform substantially the same function in substantially the same way to achieve the same results are within the scope of the present principles. Moreover, it should be recognized that structures and/or elements and/or method steps shown and/or described in connection with any disclosed form or implementation of the present principles may generally be incorporated in any other disclosed, described, or suggested form or implementation. Further, elements of different implementations may be combined, supplemented, modified, or removed to produce other implementations. Accordingly, other implementations are within the scope of the following claims.

The invention claimed is:

1. A method comprising:
 accessing a criterion for filtering digital image data, wherein the criterion is indicative of filter strength for a pixel in the digital image data;
 accessing a second criterion for filtering the digital image data, wherein the second criterion is indicative of a percentage of pixels in the digital image data that have the filter strength indicated by the criterion; and
 determining a value for a parameter for use in filtering digital image data, the value being determined based on whether the value results in at least one of the criterion and the second criterion being satisfied for at least a portion of the digital image data.

2. The method of claim 1, wherein determining the value comprises determining a value for which the criterion is satisfied for pixels in the portion of the digital image data.

3. The method of claim 1, wherein the criterion is related to a measure of one or more performance characteristics of a filter for filtering the digital image data.

4. The method of claim 3, wherein the performance characteristics are related to one or more of filter strength, filter quality, and filter complexity.

5. The method of claim 1, wherein accessing the criterion comprises receiving the criterion from a user.

6. The method of claim 1, wherein the portion of the digital image data is determined by:
 accessing the digital image data;
 evaluating pixel values of the accessed digital image data; and
 selecting the portion from the accessed digital image data based on the evaluation.

7. The method of claim 6, wherein said evaluating pixel values comprises determining a measure of homogeneity of the portion of the accessed digital image data.

8. The method of claim 6, wherein said evaluating pixel values comprises determining a variance of one or more blocks of pixels, resulting in one or more variances, and said selecting the portion comprises:
 comparing the one or more variances to a threshold;
 selecting at least one of the one or more blocks based on the comparing; and
 selecting the portion that includes pixels in the one or more selected blocks.

9. The method of claim 1, wherein said determining of said value further comprises determining a size of a spatial neighborhood based on whether the spatial neighborhood size allows the criterion to be satisfied.

10. The method of claim 1, wherein said determining of said value further comprises determining the size of a temporal neighborhood based on whether the temporal neighborhood size allows the criterion to be satisfied.

11. The method of claim 1, wherein said determining of said value further comprises determining the size of a spatial neighborhood and the size of a temporal neighborhood based on whether the spatial neighborhood size and temporal neighborhood size together allow the criterion to be satisfied.

12. The method of claim 1, wherein said determining of said value further comprises:
 determining, for the portion, a value for a pixel-difference-threshold such that both of the two criteria are satisfied for the portion of the digital image data.

13. The method of claim 1, wherein the criterion indicates a number of pixels by which a given pixel is to be averaged.

14. The method of claim 1, wherein the parameter is related to a threshold on a measure of the goodness of a candidate pixel.

15. The method of claim 14, wherein the measure of the goodness of a candidate pixel is based on the difference between at least one current pixel and at least one candidate pixel.

16. An apparatus comprising:
 a processor configured to receive digital image data and further comprising:
  a criteria input receiver configured to access at least one criterion for filtering the digital image data, wherein the criterion is indicative of filter strength for a pixel in the digital image data, and configured to access a second criterion for filtering the digital image data, wherein the second criterion is indicative of a percentage of pixels in the digital image data that have the filter strength indicated by the criterion; and
  a parameter determination unit for determining a parameter value for use in filtering the digital image data, said parameter value being determined based on whether the parameter value results in at least one of the at least one criterion and the second criterion being satisfied for at least a portion of the digital image data.

17. The apparatus of claim 16, wherein the parameter determination unit is configured to determine the parameter value for which the at least one criterion is satisfied for pixels in the portion of the digital image data.

18. The apparatus of claim 16, wherein the determined parameter value for use in filtering comprises at least one of spatial neighborhood size, temporal neighborhood size, and a threshold for verifying goodness of candidate pixels.

19. The apparatus of claim 16, wherein the processor is integrated into an encoder and the determined parameters are transmitted with the digital image data.

20. The apparatus of claim 16, wherein the processor is integrated into a decoder and parameter determination is performed on the received digital image data.

21. An apparatus comprising:
means for accessing a criterion for filtering digital image data, wherein the criterion is indicative of filter strength for a pixel in the digital image data, and for accessing a second criterion for filtering the digital image data, wherein the second criterion is indicative of a percentage of pixels that have the filter strength indicated by the criterion; and
means for determining a value for a parameter for use in filtering the digital image data, the value being determined based on whether the value results in at least one of the criterion and the second criterion being satisfied for at least a portion of the digital image data.

22. A non-transitory program storage device having an application program tangibly embodied thereon, the application program including instructions for performing at least the following:
accessing a criterion for filtering digital image data, wherein the criterion is indicative of filter strength for a pixel in the digital image data;
accessing a second criterion for filtering the digital image data, wherein the second criterion is indicative of a percentage of pixels in the digital image data that have the filter strength indicated by the criterion; and
determining a value for a parameter for use in filtering digital image data, the value being determined based on whether the value results in at least one of the criterion and the second criterion being satisfied for at least a portion of the digital image data.

23. The non-transitory program storage device of claim 22, wherein the application program further includes instructions for performing at least the following:
accessing the digital image;
evaluating pixel values of the accessed digital image; and
selecting the portion from the accessed digital image based on the evaluation,
wherein determining the value comprises determining the value based on whether the value results in the criterion being satisfied for the selected portion of the accessed digital image data.

24. A method comprising:
filtering digital image data using a filter that includes a parameter having a value determined based on whether the value results in at least one of a user-supplied criterion and a non-user-supplied criterion being satisfied for at least a portion of the digital image data,
wherein said non-user-supplied criterion is established based on the user-supplied criterion, and said non-user-supplied criterion is different from said user-supplied criterion.

25. The method defined in claim 24, wherein user-supplied criterion and the non-user-supplied criterion are each related to a measure of one or more performance characteristics of a filter for filtering the digital image data.

26. The method of claim 25, wherein the performance characteristics are related to one or more of filter strength, filter quality, and filter complexity.

* * * * *